March 21, 1933.                J. SUNNEN                1,902,194
                           CYLINDER GRINDER
                Original Filed April 11, 1930    3 Sheets-Sheet 1
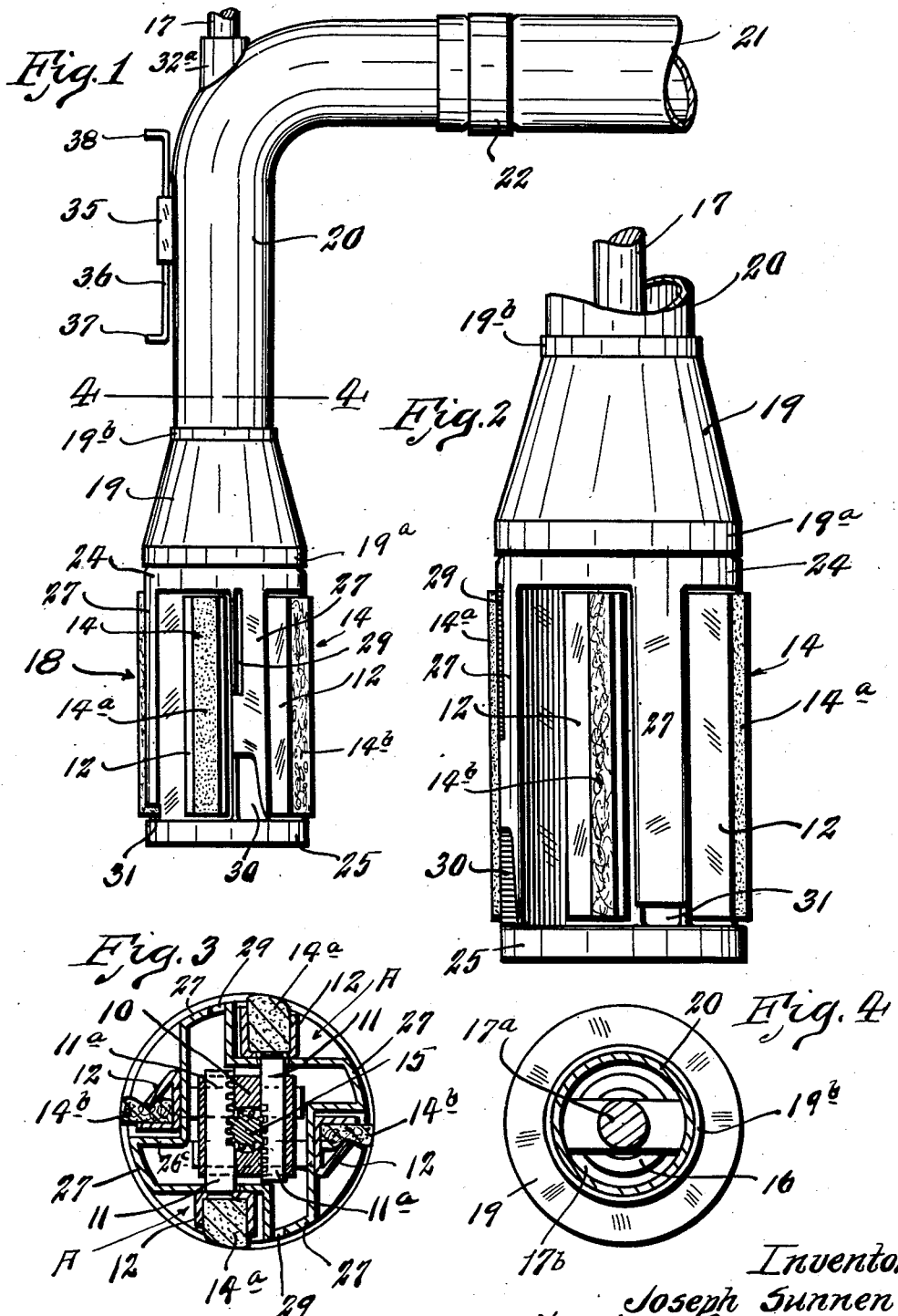

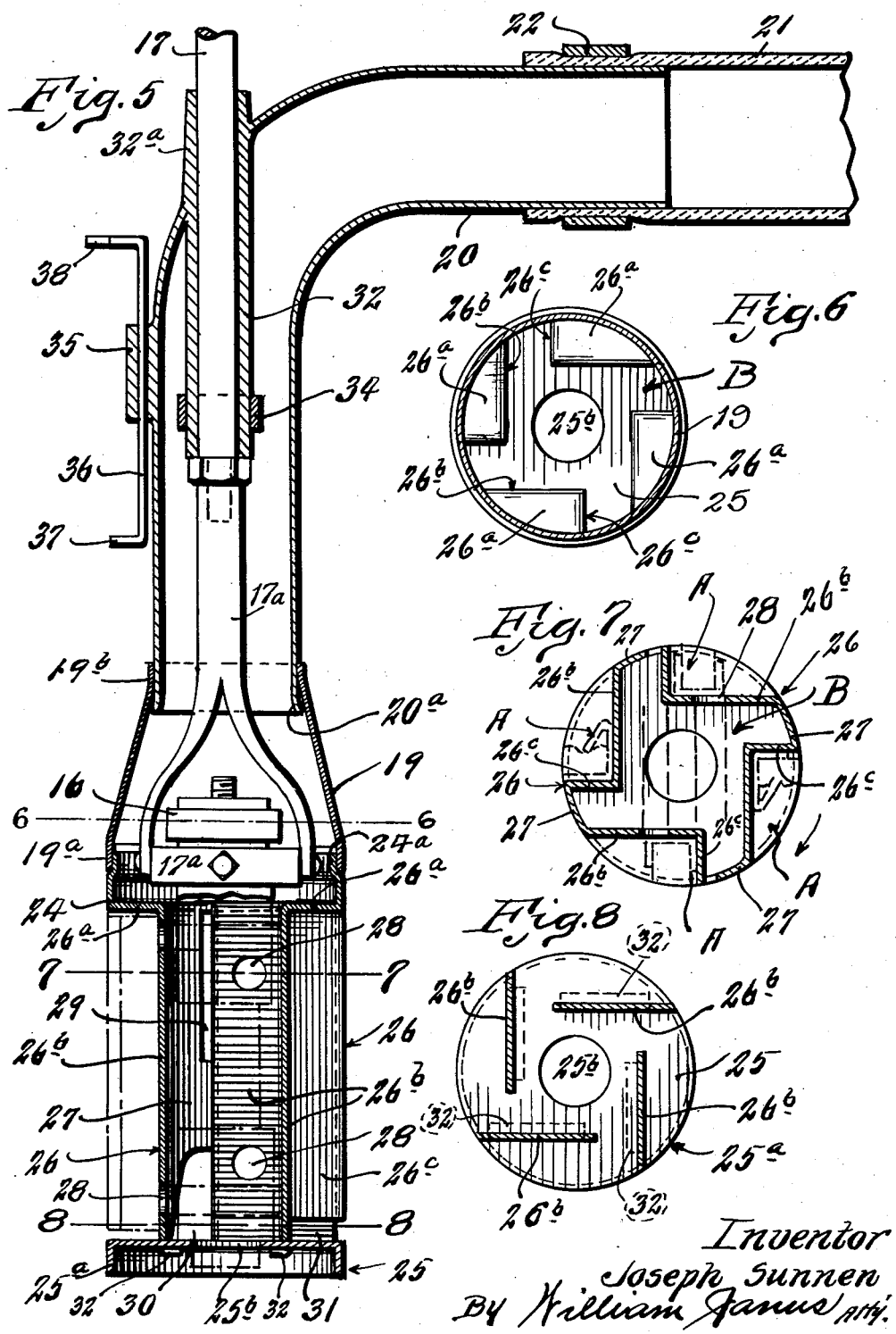

March 21, 1933.  J. SUNNEN  1,902,194
CYLINDER GRINDER
Original Filed April 11, 1930  3 Sheets-Sheet 3
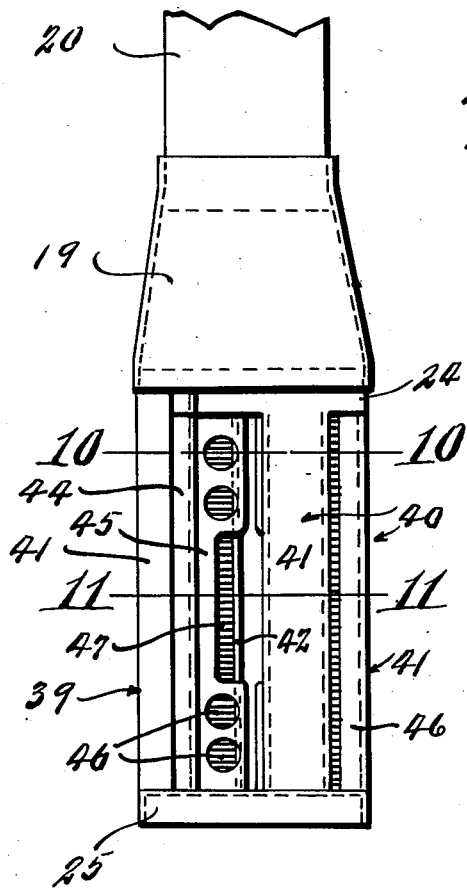
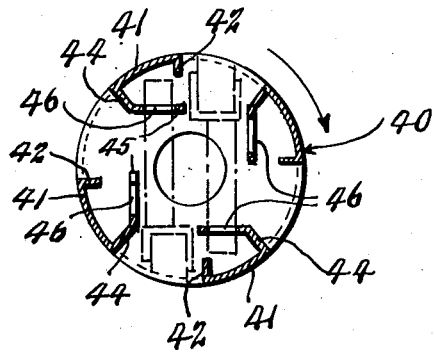
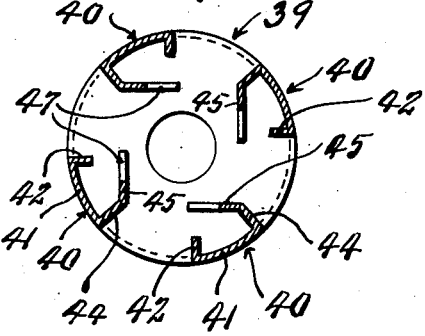
Inventor
Joseph Sunnen
By William Janus
Atty.

Patented Mar. 21, 1933

1,902,194

UNITED STATES PATENT OFFICE

JOSEPH SUNNEN, OF ST. LOUIS, MISSOURI

CYLINDER GRINDER

Application filed April 11, 1930, Serial No. 443,293. Renewed March 11, 1932.

This invention relates generally to cylinder grinders or honing devices and more particularly to dust collectors therefor.

Heretofore in grinding or honing cylinders of internal combustion engines, pumps, and the like, generally no attempt has been made to collect the dust and the latter was allowed to circulate in and about the device operated upon. As this dust is composed of fine particles of metal and the abrasive substance released during the honing operation, it is obvious that this practice is not conductive to the good health of the workmen and is injurious to the machinery.

The primary purpose of my invention is to provide a dust collector which can be attached to and used in conjunction with the cylinder grinder whereby the dust is collected and conveyed to a suitable receptacle.

Other objects of the invention are to provide a dust collector which is so constructed that it can be used in conjunction with a cylinder grinder without interfering with the operation of the latter and which has an intake head arranged so as to enclose the main body of the grinder and has its intake openings arranged in close proximity to the cylinder engaging elements and to the surface operated upon.

Still other objects of the invention are to provide a dust collector having its intake head arranged in cooperative relation with the grinder and having its conduit provided with a bearing for the operating stem of the grinder whereby said dust collector can be supported on the grinder without interfering with the operating connections thereof, there being a flexible connection arranged between said conduit and the upper end of said collector head so as to permit relative movement thereof in correlation with the movement of said stem relatively to the grinder.

Further objects of the invention are to provide a dust collector having its collector head arranged to enclose the grinder of the type disclosed in my copending application filed November 17, 1927, Serial No. 233,788, said collector head being provided with apertured walls through which the element carrying mounts extend outwardly and said collector head being provided with intake openings arranged in close proximity to said cylinder engaging elements and the cylinder surfaces over which said elements operate.

With these and other objects in view, my invention consists in certain novel features of construction and arrangement of parts, hereinafter more fully described and claimed, and illustrated in the accompanying drawings, in which—

Figure 1 is a side elevational view of my dust collector showing the cylinder grinder arranged therein.

Figure 2 is an enlarged side elevational view taken at right angles to Figure 1 and showing the collector head and parts associated therewith.

Figure 3 is a horizontal cross section taken on line 3—3 of Figure 1.

Figure 4 is a horizontal cross section taken on line 4—4 of Figure 1.

Figure 5 is an enlarged vertical cross section through the dust collector and showing the cylinder grinder arranged therein.

Figure 6 is a horizontal cross section taken on line 6—6 of Figure 5 with the cylinder grinder shown in dotted lines.

Figure 7 is a horizontal cross section taken on line 7—7 of Figure 5 with the cylinder grinder shown in dotted lines.

Figure 8 is a horizontal cross section taken on line 8—8 of Figure 5 with the cylinder grinder removed.

Figure 9 is a side elevational view of a modified form of my invention.

Figure 10 is a horizontal cross section taken on line 10—10 of Figure 9.

Figure 11 is a horizontal cross section taken on line 11—11 of Figure 9.

The grinder or honing device in conjunction with which my dust collector is designed to be used comprises a carrier member 10 in which are slidably mounted transverse members 11 of mounts 12. These mounts are disposed parallel with the longitudinal axis of carrier 10 and have arranged thereon cylinder engaging elements 14. As shown herein certain of said elements consist of abrasive members 14$^a$ and certain other consists of non-abrasive elements 14$^b$. The transverse members 11 are provided with rack portions 11ª which are operatively engaged by an elongated pinion member 15. This pinion member is revolubly mounted and coaxially disposed in carrier 10 and is adapted to be actuated to expand or retract said mounts relatively to the axis of member 10. The upper end of this pinion member projects above carrier 10 and is operatively associated with manually operable means 16 by means of which said pinion can be operated to adjust said cylinder engaging elements, said means 16 being self-locking to prevent accidental retraction of said elements.

The grinder is supported and actuated through a stem 17, the lower end of which is flexibly connected to the upper end of carrier 10 by means of a yoke member 17ª and a ring 17ᵇ which have pivotal connection with each other and which ring 17ᵇ is pivotally mounted on the upper end of said carrier. The upper end of stem 17 is adapted to be attached to the chuck (not shown) of a suitable electric hand drill whereby said grinder can be moved longitudinally in the cylinder in which it operates.

The general construction and operation of the grinder herein disclosed is substantially the same as that shown in the copending application hereinbefore mentioned, to which reference may be had for more detailed description.

The dust collector consists of an intake head or casing 18 to the upper end of which is attached a reducer 19. The upper end of this reducer has a flexible connection with the lower end of a vertically disposed air pipe 20. A flexible conduit 21 is attached to the free end of member 20 by a collar 22 and extends therefrom and connects to a suitable exhaust device (not shown) whereby the dust is carried away from the grinder and deposited in a suitable receptacle.

The intake head 18 consists of a top member 24, a bottom member 25, and a series of vertically disposed wall members 26 disposed between and uniting said top and bottom members 24 and 25. Top member 24 is in the shape of a collar to the lower edge of which are attached the horizontally disposed top walls 26ª of wall members 26. The bottom member 25 is of circular shape and is provided with downwardly presented marginal flange 25ª and is further provided with a central opening 25ᵇ through which the lower end of carrier 10 projects downwardly.

Each wall member 26, of which there are four in the present instance, comprises a wall section 26ᵇ, which is comparatively wide, and wall section 26ᶜ, which is comparatively narrow. Sections 26ᵇ and 26ᶜ are disposed at right angles to each other with their inner edges joined together and with their outer edges arranged flush with the peripheral surfaces of the top and bottom members 24 and 25. These outer edges of each pair of sections 26ᵇ and 26ᶜ are joined together by a vertically disposed segmental wall 27, the ends of which are connected to the respective members 24 and 25. Thus a series of outwardly presented vertically disposed recesses or pockets A is formed on the outside of the intake head 18, while the inside thereof is formed into a chamber B.

Each of said recesses A is adapted to receive one of the mounts 12, including the elements 14 thereof, and each wall section 26ᵇ is provided with a pair of spaced apertures 28, through which the transverse members 11 of the respective mount extends inwardly into operative engagement with pinion 15. (See Figure 3.) Thus the cylinder engaging elements 14 can be adjusted without interference from the housing or intake head 18.

One pair of diametrically opposed segmental walls 27, namely, that pair arranged adjacent to the abrasive elements 14ª, is provided with a plurality of openings through which dust is sucked into the chamber B. The upper opening 29 is elongated and is vertically disposed adjacent to the wall section 26ᶜ which is nearest the abrasive element 14ª. The lower inlet opening 30 is comparatively wide and has one side disposed obliquely so that the opening at its lower end is nearly the width of said segmental wall and opens against the bottom member 25. This opening tapers upwardly and the upper end thereof is spaced a suitable distance from the lower end of opening 29.

The segmental walls arranged adjacent to the non-abrasive elements 14ᵇ are provided with inlet openings 31 near the bottom member 25. These openings 31 extend substantially the full width of the segmental wall and are comparatively of small cross sectional area as compared with the openings 30.

When the device is actuated, the inlet openings 29, 30 and 31, being arranged immediately in the rear of the abrasive elements, permit dust to be drawn into the chamber B through the action of air currents which are sucked thereinto by the exhaust device.

Wall sections 26ᵇ and 26ᶜ may be formed either of one piece or may be formed of several pieces welded together. Similarly the ends of said wall sections may be welded to the top and bottom members 24 and 25.

As shown in the drawings, the bottom member 25 is secured in position by means of extensions 32 which are formed integral with the lower ends of wall sections 26ᵇ and are extended through slots formed in member 25 and are then bent against the underside thereof, as shown in Figure 8. However, various sections can be secured together in any other suitable manner or the entire intake head can be cast in a single piece.

The top member 24 is provided with a reduced flange 24ª over which slips downwardly presented annular flange 19ª of reducer 19. The upper end of said reducer is provided with an annular flange 19ᵇ which fits loosely over the flared out lower end 20ª of member 20 so that reducer 19 and member 18 can occupy slight angular position with respect to member 20.

The yoke member 17ª extends upwardly through reducer 19 into the lower end of member 20 and is secured to the lower end of stem 17. The latter is journaled in a bearing 32 which is disposed within member 20 and has its upper end projecting outwardly therefrom as indicated at 32ª. Thus a convenient outlet is provided for stem 17 without impairing the exhaust capacity of the device. Bearing 32 is arranged in coaxial alignment with member 20 and with carrier 10 so that stem 17 preserves proper operative relationship with said carrier. The lower end of bearing 32 is preferably engaged by a tie member 34 which extends transversely through said member 20 and serves to steady said bearing.

The vertically disposed leg of member 20 is provided on its outer surface with a vertically disposed bearing 35 in which is slidably arranged a gauge 36, the lower end of which is bent at right angles as indicated at 37, while the upper end is provided with a suitable handle 38 by means of which said gauge can be adjusted in vertical plane. The horizontal extension 37 is arranged so as to engage the top of a cylinder and provide a stop for the guide. Thus said gauge can be adjusted to limit the downward movement of the device when in the cylinder. The use of this gauge is desirable as with the dust collector enclosing the grinder it is sometimes difficult to observe the extent of downward movement of the device.

It is observed that the interior of member 10, namely, chamber B is in communication with the exterior only through inlet openings 29, 30 and 31. As said openings are in close proximity with and immediately in the rear of cylinder engaging elements 14, it is obvious that any dust or fine particles produced by the operation of the grinder will be sucked into said chamber and thence through members 20 and 21 conveyed away from the grinder. Thus the injurious dust instead of being released into the atmosphere to be inhaled by the workman or cause injury to the machinery is exhausted from the cylinder through the exhausting system and deposited into a suitable receptacle. The suction apparatus or dust collector is so arranged that it does not interfere either with the manipulation of the grinder or honing apparatus or with the efficient operation of the cylinder engaging elements.

In the preceding form, a dust collector is shown which is designed for use with grinders operating in cylinders of two inches or more in diameter. In Figures 9 to 11 a modified form is shown which is adapted for use with grinders or honing apparatus for operation in cylinders less than two inches in diameter. In this form the intake head 39 is provided with vertically disposed wall sections 40, each of which consists of a peripheral wall section 41, one edge of which is turned inwardly as indicated at 42 and the opposite edge of which is first bent radially as indicated at 44 and is then bent so as to be disposed at right angles to edge 42, as indicated at 45. This portion 45 is provided near its ends with apertures 46 for receiving the transverse members 11 and is provided intermediate its ends with a cut-out portion 47 which forms the inlet opening through which dust and air is sucked into the interior of the intake member 39. Otherwise the construction and operation is substantially the same as in the preceding form.

To place the dust collector in position, stem 17 is inserted through bearing 32 and the intake head 18 is placed over the carrier 10 from which the mounts 12 have first been detached. After the intake head is in position the mounts 12 are returned in position with the transverse member 11 extending into the interior or chamber B through apertures 28 with the mounts 12 and elements 14 occupying recesses A. When in this position the intake head is supported by the carrier 10 and member 20 is supported by stem 17. The reducer member 19 is disengageable from top member 24 and slidable outwardly by member 20 in order to provide access to the adjusting means 16 whereby the elements 14 can be adjusted. This reducer also provides flexible connection between the intake head 18 and member 20 so as to permit slight angular movement of said intake head relatively to member 20 in correlation with the movement of the carrier 10 relatively to the yoke member.

In the modified form shown in Figures 9 to 11 it is not necessary to detach the mounts 12 from the carrier as in this construction the transverse members 11 are in engagement with the respective apertures 46 only during the extreme retracted position of said mounts, whereupon the rear ends of said transverse members are received into said apertures.

The advantages of my dust collector reside not only in the fact that fine particles of abrasive material and metal are prevented from settling on various parts of machinery but chiefly in the fact that the injurious dust or matter is prevented from being released into the atmosphere so that the workman is not exposed to the danger of inhaling this dust. As said dust consists mainly of fine particles of abrasive material and metal and as the grinding or honing operation is carried on in a dry state, it is readily apparent that unless such dust is confined the workman is exposed to considerable hazard with regard to his health.

By the use of my exhausting system the dust is confined before it has a chance to escape to the atmosphere, thereby safeguarding the health of the workman and eliminating troublesome dust conditions in the shop.

My dust exhausting system is designed primarily for use in conjunction with cylinder grinders or honing apparatus but it is equally as well adaptable for use in connection with other forms of apparatus wherein it is desired to collect dust or other injurious matter and prevent it from being released into the atmosphere.

The dust collector encloses the grinder and is arranged so that it does not interfere with the operation or manipulation thereof. Thus when the collector is assembled on the grinder, the intake openings of the exhausting system are arranged in close proximity to the cylinder engaging elements so that the dust is readily exhausted from the cylinder. No time is lost in moving the grinder and the exhaust apparatus from one cylinder to the other and the workman is not required to handle additional mechanism or to attach extraneous members to the cylinders.

The lower end of the collector is closed by member 25 and the interior of the collector is under suction so that hardly any dust can escape through the lower end of the cylinder. Therefore, while it is advisable to cover the bearings of the crank shafts as a precautionary measure, it is not necessary to go to extreme lengths in protecting such bearings when my dust collector is used.

My device is of simple construction, will successfully exhaust the dust released by the grinding operation, and is arranged in cooperative relation with the grinder and movable therewith so that it is always ready for use.

While I have shown the preferred form of my invention, it is obvious that various changes and modifications in the embodiment of my dust collector can be made and substituted for those herein shown and described without departing from the spirit of my invention.

I claim:

1. A dust collector comprising a casing adapted to receive a cylinder grinder carrier and having peripheral outwardly presented pockets for receiving the mounts extensibly mounted on said carrier, an elbow member connected to one end of said casing, and a flexible conduit leading from said elbow member to a suitable exhaust apparatus whereby air can be exhausted from said casing, the latter being provided with a plurality of inlet openings arranged adjacent to said mounts to admit air and dust into the interior of said casing.

2. A dust collector comprising a casing for enclosing a carrier and having its periphery provided with a plurality of outwardly presented pockets for receiving the cylinder engaging elements carried by said carrier, said casing having the lower end closed, an elbow member having one end flexibly connected to the upper end of said casing, and a flexible conduit connected to the other end of said elbow for exhausting air from said casing, the latter being provided in its walls with inlet openings through which air and dust is sucked into said casing.

3. A dust collector comprising a casing for enclosing a cylinder grinder, said casing being provided in its periphery with outwardly opening vertically disposed recesses for receiving the adjustable cylinder engaging elements carrying mounts, there being inlet openings formed in the peripheral wall of said casing in close proximity to said pockets through which dust and air is admitted into said casing, and an exhaust conduit flexibly connected to and leading from said casing for conveying away the dust sucked into said casing.

4. A dust collector comprising an elongated casing having a bottom wall and an open top, said casing being adapted to receive a cylinder grinder, the peripheral wall of said casing being formed with a plurality of circumferentially spaced outwardly opening recesses for receiving the mounts carrying the cylinder engaging elements, the transverse members of said mounts extending inwardly through suitable openings formed in certain walls of said recesses and engaging said carrier, and an exhaust conduit flexibly connected to the upper end of said casing for producing suction therein, the peripheral wall of said casing being provided with a plurality of inlet openings whereby dust produced by the operation of the grinder is sucked into said casing and conveyed away through said conduit.

5. A dust exhausting apparatus for cylinder grinders comprising an elongated casing adapted to receive a cylinder grinder, a bottom wall in said casing and provided with a seat for receiving the lower end of said grinder, the peripheral wall of said casing being provided with a series of longitudinally disposed pockets adapted to receive the cylinder engaging elements of the grinder, there being inlet openings formed in the peripheral wall of said casing adjacent to said pockets, and an elbow member flexibly connected to the upper end of said casing and in communication with suitable exhaust means whereby suction is produced in said casing and dust and air is sucked thereinto through said inlet openings.

6. A dust exhausting apparatus for cylinder grinders comprising a cylindrical casing adapted to receive a cylinder grinder, said casing having its lower end provided with a bottom member and having an open upper end, the peripheral wall of said casing being provided with longitudinally disposed outwardly presented pockets for receiving the elements carrying mounts, said peripheral wall being provided with inlet openings immediately rearwardly of said mounts whereby fine particles of material released by the operation of the grinder are sucked into said casing through said inlet openings, and means connected to the upper end of said casing for exhausting air and dust therefrom.

7. A dust collector of the class described comprising in combination a cylindrical casing provided in its periphery with a series of longitudinally disposed outwardly presented pockets and having a plurality of inlet openings arranged adjacent to said pockets, an elbow member spaced from the upper end of said casing, a flexible conduit leading from one end of said elbow to a suitable exhaust apparatus, and a conduit section detachably engaging the other end of said elbow and the upper end of said casing to provide flexible connection therebetween whereby suction is produced in said casing and dust and air is sucked thereinto through said inlet openings and conveyed away through said flexible conduit.

8. A dust collector of the class described comprising a cylindrical casing having a chamber adapted to receive the carrier of a cylinder grinder and having its peripheral wall provided with a series of outwardly presented longitudinally disposed pockets adapted to receive the extensible parts of said grinder, there being inlet openings formed in said peripheral wall adjacent to said pockets whereby air and dust is sucked into said casing, and means connected to one end of said casing for exhausting air and dust therefrom.

9. A dust collector of the class described comprising in combination with a cylinder grinder, of a cylindrical casing enclosing said grinder and provided in its peripheral wall with a series of longitudinally disposed outwardly presented pockets for receiving the expansible mounts of said grinder, said peripheral wall being provided with a plurality of spaced inlet openings arranged adjacent to said pockets and through which air and dust is drawn into said casing.

10. A dust collector of the class described comprising in combination with a cylinder grinder, of a cylindrical casing enclosing said grinder and provided in its peripheral wall with a series of longitudinally disposed outwardly presented pockets for receiving the expansible mounts of said grinder, said peripheral wall being provided with a plurality of spaced inlet openings through which air and dust is drawn into said casing, the lower end of said casing being closed, and a suction conduit flexibly connected to the upper end of said casing for conveying away the air and dust therefrom.

11. A dust collector of the class described comprising a cylindrical casing adapted to enclose a cylinder grinder, said casing being provided with a series of longitudinally disposed pockets for receiving the expansible mounts of said grinder, there being inlet openings formed in the peripheral wall of said casing through which air and dust is drawn thereinto, a member for closing the lower end of said casing, and a conduit flexibly connected to the upper end of said casing and adapted to be connected to a suitable suction apparatus to produce suction in said casing.

12. In a dust collector of the class described, the combination with a cylinder grinder, of a cylindrical casing enclosing the body portion of said grinder and provided with a series of longitudinally disposed pockets for receiving the mounts of said grinder, there being openings formed in certain walls of said pockets through which the rack portions of said mounts extend inwardly into the body portions of said grinder, the peripheral wall of said casing being provided with a plurality of inlet openings arranged adjacent to said pockets whereby air and dust are drawn into said casing, the lower end of said casing being closed, and a tubular extension flexibly connected to the upper end of said casing and extending upwardly therefrom.

13. A dust collector of the class described comprising a cylindrical casing adapted to enclose a cylinder grinder, said casing being provided with a series of longitudinally disposed pockets for receiving the expansible mounts of said grinder, there being inlet openings formed in the peripheral wall of said casing through which air and dust is drawn thereinto, a member for closing the lower end of said casing, a conduit flexibly connected to the upper end of said casing and adapted to be connected to a suitable suction apparatus to produce suction in said casing, the lower end of said casing being closed and provided with a centrally disposed seat in which is arranged a longitudinal extension projecting downwardly from the lower end of the body portion of said cylinder grinder.

14. In a device of the class described, the combination of a cylinder grinder having an actuating spindle extending upwardly therefrom, a cylindrical casing enclosing said cylinder grinder and provided in its peripheral wall with a series of longitudinally disposed pockets for receiving the mounts of said grinder, there being suitable openings formed in the inner walls of said pockets through which the rack portions of said pocket extend inwardly and to the body portion of said grinder, said peripheral wall being provided with a plurality of inlet openings arranged adjacent to said pockets through which air and dust are drawn into said casing, a tubular extension having its lower end flexibly connected to the upper end of said casing, and an elbow conduit connected to the upper end of said extension and provided with a bearing through which said spindle projects outwardly from said conduit.

15. In a device of the class described, the combination with a cylinder grinder, of a cylindrical casing enclosing said grinder and having a closed lower end and provided in its peripheral wall with a series of longitudinally disposed pockets for receiving the mounts of said grinder, certain walls of said pockets being provided with suitable openings through which the rack portions of said mounts extend inwardly into engagement with the body portion of said grinder, there being inlet openings formed in the peripheral wall of said cylindrical casing through which air and dust are drawn into said casing, an elbow conduit in communication with the upper end of said cylindrical casing and adapted to be connected to a suitable suction apparatus for conveying away air and dust from said casing, and a tubular bearing arranged in said elbow conduit coaxially with said cylinder grinder through which the actuating portion of said grinder extends outwardly.

16. In combination with a cylinder grinder comprising grinding elements adapted to be rotated over the cylinder wall and a shaft for supporting and actuating said grinding elements, a dust collector for said grinder comprising a casing having a rotatable portion mounted on said grinder and a non-rotatable portion extending outwardly therefrom and having a swivel connection therewith, and a bearing in the non-rotatable portion for the grinder shaft.

17. In combination with a grinding machine for engine cylinders comprising grinding elements adapted for rotation over the cylinder wall, a dust collector comprising a casing operatively connected with the grinding machine, a drive shaft for the grinding machine passing through said casing and having a bearing therein, and a flexible connection from the casing to a suitable exhausting device.

18. In combination with a cylinder grinding machine for engine cylinders, said machine including laterally extending revoluble grinding elements, a dust collector comprising a casing in cooperative association with said grinding machine, a drive shaft for the grinding machine passing through an opening in said casing, and a conduit leading from the casing to a suitable exhausting device.

19. In combination with a cylinder grinding machine for engine cylinders, said machine including laterally extended revoluble grinding elements, a dust collector comprising a casing in cooperative association with said grinding machine, a drive shaft for the grinding machine passing through an opening in said casing, and means for maintaining said opening closed against excessive air leakage.

20. In combination with a cylinder grinder comprising grinding elements adapted to be rotated over the cylinder wall and a shaft for supporting and actuating said grinding elements, a dust collector for said grinder comprising a casing adapted to be disposed within the cylinder and within the margins of the abrading surfaces of said grinding elements, suitable connectors between grinding elements and shaft, said connectors passing through the casing, and said drive shaft passing through the casing.

21. The combination of a cylinder grinder and a dust collector therefor comprising a casing adapted to enter the cylinder, grinding elements arranged on the outside of the casing, a carrier member on the inside of the casing for the grinding elements, connectors between the grinding elements and carrier, said connectors passing through the casing wall, and a drive shaft for the carrier passing through the casing.

22. A dust exhaust apparatus adapted for use with engine cylinder grinders comprising an open top casing of general cylindrical shape and insertible in a cylinder, said casing having openings in its side wall for receiving supporting elements of the grinder, and other openings to receive the grinding dust.

23. In combination with a cylinder grinder having abrasive elements adapted for linear contact with the cylinder wall and means for actuating said elements, a dust collector comprising a casing within the margins of the abrasive elements and enclosing said actuating means, said casing having air and dust inlet openings adjacent to the abrasive elements.

In testimony whereof I hereunto affix my signature this 17th day of March, 1930.

JOSEPH SUNNEN.